(12) United States Patent
Kang et al.

(10) Patent No.: US 9,898,149 B2
(45) Date of Patent: Feb. 20, 2018

(54) TOUCH ANALOG FRONT END AND TOUCH SENSOR CONTROLLER HAVING THE SAME

(71) Applicant: Samsung Electronics Co., Ltd., Suwon-si (KR)

(72) Inventors: Sanghyub Kang, Yongin-si (KR); San-ho Byun, Bucheon-si (KR); Jinchul Lee, Seoul (KR); Chadong Kim, Gwacheon-si (KR); Bumsoo Kim, Seoul (KR); Junchul Park, Daegu (KR); Hojin Park, Suwon-si (KR); Hyunkyu Ouh, Yongin-si (KR); Kyunghoon Lee, Seoul (KR); Michael Choi, Seoul (KR); YoonKyung Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 302 days.

(21) Appl. No.: 14/741,940

(22) Filed: Jun. 17, 2015

(65) Prior Publication Data
US 2016/0124544 A1 May 5, 2016

(30) Foreign Application Priority Data

Nov. 5, 2014 (KR) .................. 10-2014-0153076

(51) Int. Cl.
*G06F 3/044* (2006.01)
*G06F 3/041* (2006.01)
*G06F 1/16* (2006.01)
*G06F 3/01* (2006.01)
*G06F 3/0354* (2013.01)

(52) U.S. Cl.
CPC .............. *G06F 3/044* (2013.01); *G06F 1/163* (2013.01); *G06F 3/011* (2013.01); *G06F 3/03547* (2013.01); *G06F 3/0418* (2013.01); *G06F 2203/0339* (2013.01); *G06F 2203/04108* (2013.01)

(58) Field of Classification Search
None
See application file for complete search history.

(56) References Cited

U.S. PATENT DOCUMENTS

| 8,614,693 | B2 | 12/2013 | King et al. | |
| 9,244,569 | B2 * | 1/2016 | Guedon | G06F 3/044 |
| 2011/0001492 | A1 * | 1/2011 | Nys | H03M 1/123 |
| | | | | 324/658 |
| 2011/0242048 | A1 | 10/2011 | Guedon et al. | |
| 2012/0256869 | A1 * | 10/2012 | Walsh | G06F 3/0416 |
| | | | | 345/174 |

(Continued)

*Primary Examiner* — Seokyun Moon
(74) *Attorney, Agent, or Firm* — Onello & Mello, LLP

(57) ABSTRACT

A touch analog front-end (AFE) for a touch sensitive screen may include a transmitter configured to charge a touch panel and a receiver configured to sense the touch panel. The receiver may include a charge-to-voltage (C2V) converter configured to convert a change of capacitance received from the touch panel into a voltage signal, a correlated double sampling (CDS) block configured to convert the voltage signal into a differential signal and to sample each of the positive and the negative signals of the differential signal, and an integrator configured to accumulate a difference between the sampled positive and negative signals.

18 Claims, 17 Drawing Sheets

(56) References Cited

U.S. PATENT DOCUMENTS

2014/0015774 A1* 1/2014 Bussat ................ G06F 3/0418
345/173
2014/0078096 A1 3/2014 Tan et al.
2016/0026335 A1* 1/2016 Ahn .................... G06F 3/0418
345/173

* cited by examiner

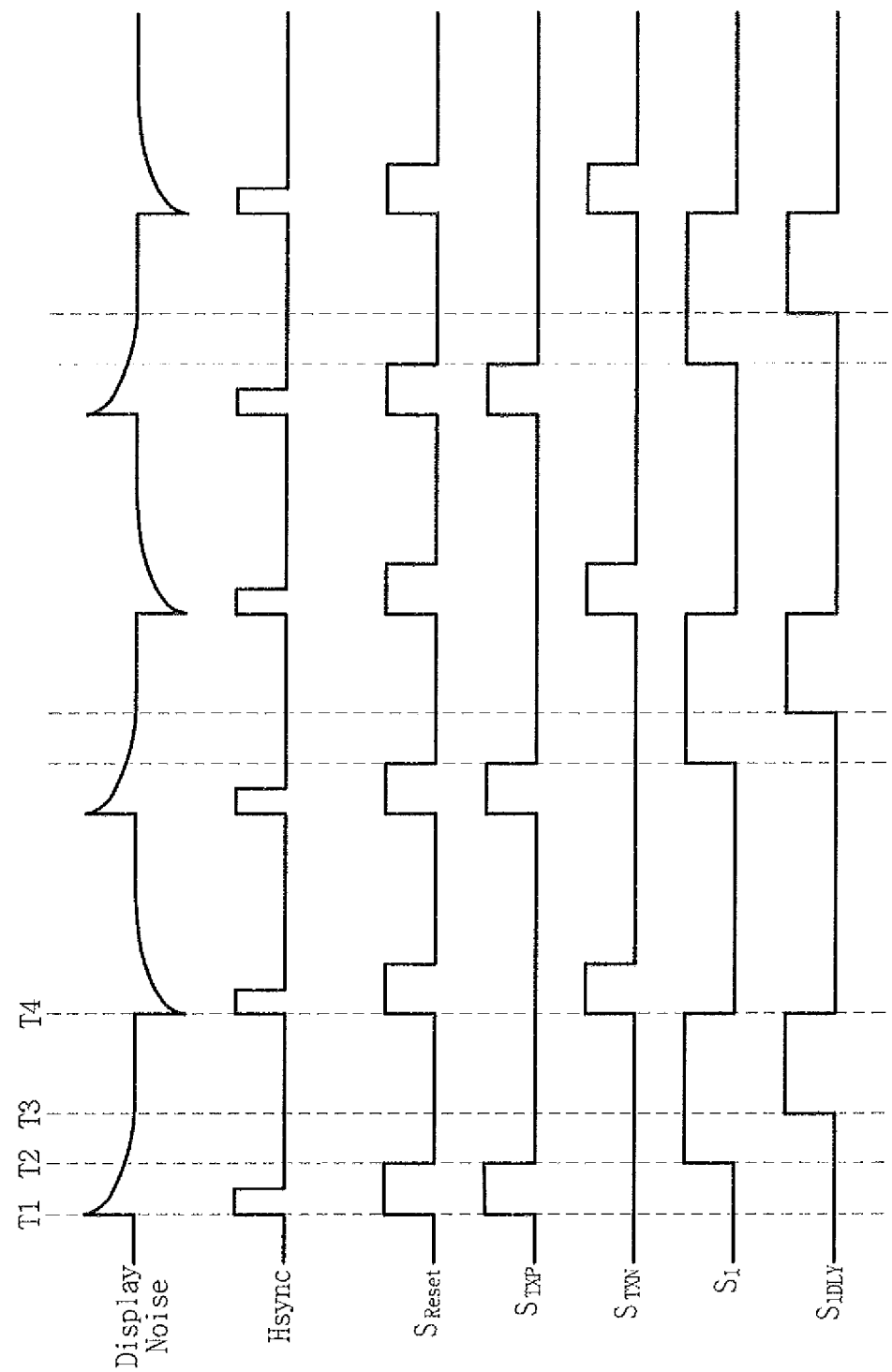

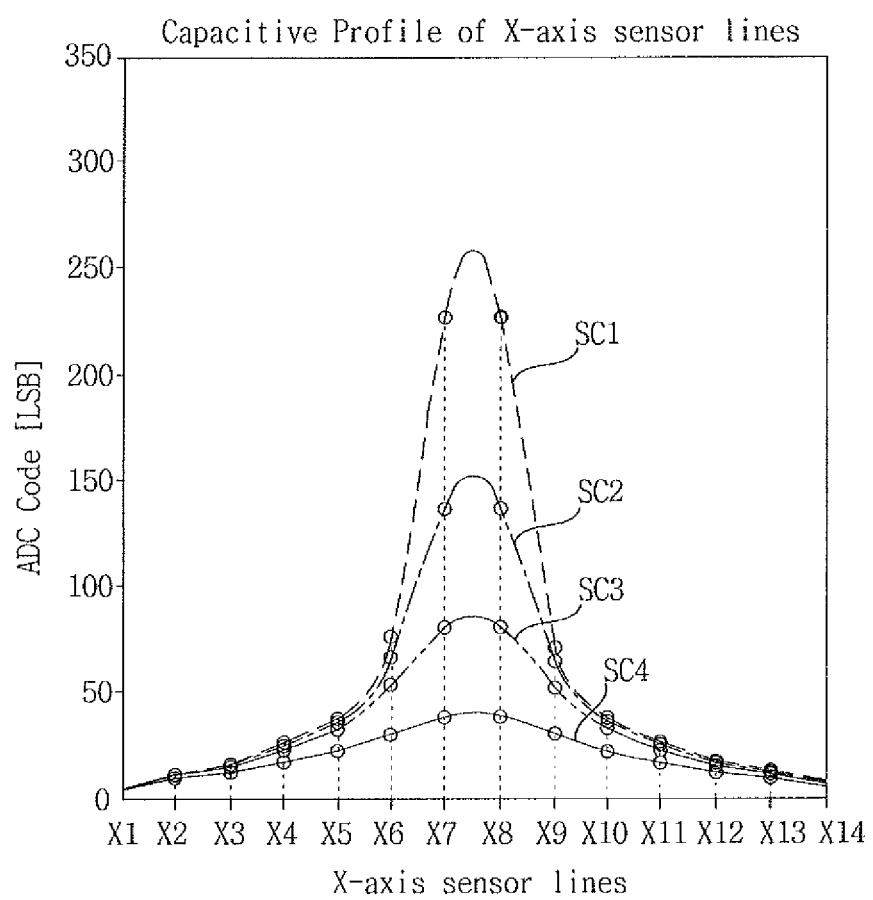

TOUCH ANALOG FRONT END AND TOUCH SENSOR CONTROLLER HAVING THE SAME

CROSS-REFERENCE TO RELATED APPLICATION

This application claims priority under 35 U.S.C. § 119 to Korean Patent Application No. 10-2014-0153076 filed on Nov. 5, 2014, the entire contents of which are incorporated herein by reference in their entirety.

BACKGROUND

Field

Embodiments of inventive concepts relate to a touch analog front-end (AFE), and more particularly, to a touch AFE that improves operation of a touch input device.

Description of Related Art

A user may input information such as a numbers into an electronic device such as a cellular phone, tablet, or computer, for example, using a keypad device such as a touch screen. Because a keypad's visibility may be reduced (in low light situations, for example), the accuracy of the keypad input device is of significant importance.

Touch screens are typically either pressure sensitive or capacitive. Pressure sensitive screens employ pressure-sensitive devices that alter resistance in response to pressure and capacitive screens employ a capacitor to sense the amount of discharge from a charged surface of a screen when touching the surface of the screen. Currently, the capacitive type which has high-resolution and good sensitivity has been widely used.

A hover touch recognition function which extracts information about a position (i.e., a coordinate) and a height of a finger floated over a screen of a mobile device has been applied to a commercial appliance. A technique such as the hover touch requires high level sensitivity and the performance of the hover touch may be seriously degraded due to external noises. Such noise sources may include display noise, power line noise, burst noise, and charger noise, for example.

SUMMARY

Exemplary embodiments in accordance with principles of inventive concepts provide a touch AFE capable of removing a low frequency noise, and doubling sensitivity of a touch input to sense a hover event on proximity without affecting a noise generated by a display device.

Exemplary embodiments of the inventive concept provide a touch sensor controller having the touch AFE.

In accordance with principles of inventive concepts, a touch analog front-end (AFE) includes a transmitter configured to charge a touch panel; and a receiver configured to sense the touch panel, and the receiver includes a charge-to-voltage (C2V) converter configured to convert an amount of change of capacitance received from the touch panel into a voltage signal; a correlated double sampling (CDS) block configured to divide the voltage signal into a positive signal and a negative signal and sample each of the positive signal and the negative signal; and an integrator configured to accumulate a difference between the sampled positive signal and the sampled negative signal.

In an exemplary embodiment, the touch panel may include M X-axis line sensors and N Y-axis line sensors, the transmitter may include M+N transmitters configured to charge each of the M X-axis line sensors and the N Y-axis line sensors, and the receiver may include first and second receivers configured to sense each of a pair of the M X-axis line sensors or a pair of the N Y-axis line sensors.

In an exemplary embodiment, a display driver integrated circuit (DDI) may transmit a horizontal synch signal to a display panel and each of the M+N transmitters may charge each of the M X-axis line sensors and the N Y-axis line sensors in synchronization with the horizontal synch signal at the same time.

In an exemplary embodiment, after each of the M+N transmitters may charge each of the M X-axis line sensors and the N Y-axis line sensors at the same time, each of the first and second receivers may sense a pair of each of the M X-axis line sensors and the N Y-axis line sensors at the same time.

In an exemplary embodiment, the CDS block may include a first sample-and-hold (SHA) filter configured to sample the positive signal and a second SHA filter configured to sample the negative signal.

In an exemplary embodiment, the CDS block may sample the positive signal and the negative signal and remove a high-frequency noise.

In an exemplary embodiment, the integrator may remove a low-frequency noise using a voltage difference between the sampled positive signal and the sampled negative signal.

In an exemplary embodiment, the integrator may generate a capacitive profile using the accumulated voltage signal.

In accordance with an exemplary of the inventive concept, a touch sensor controller (TSC) including the touch analog front-end (AFE) includes M+N transmitters configured to charge each of M X-axis line sensors and N Y-axis line sensors, and first and second receivers configured to sense a pair of the M X-axis line sensors or a pair of the N Y-axis line sensors, wherein each of the first and second receiver to include a C2V converter configured to convert an amount of change of a capacitance received from the touch panel into a voltage signal; a CDS block configured to divide the voltage signal into a positive signal and a negative signal and sample each of the positive signal and the negative signal; and an integrator configured to accumulate a difference between the sampled positive signal and the sampled negative signal.

In an exemplary embodiment, a DDI may transmit a horizontal synch signal to a display panel and each of the M+N transmitters may charge each of the M X-axis line sensors and the N Y-axis line sensors in synchronization with the horizontal synch signal at the same time.

In an exemplary embodiment, after each of the M+N transmitters may charge each of the M X-axis line sensors and the N Y-axis line sensors at the same time, each of the first and second receivers may sense a pair of each of the M X-axis line sensors and the N Y-axis line sensors at the same time.

In an exemplary embodiment, the CDS block may include a first sample-and-hold (SHA) filter configured to sample the positive signal and a second SHA filter configured to sample the negative signal.

In an exemplary embodiment, the CDS block may sample the positive signal and the negative signal and remove a high-frequency noise.

In an exemplary embodiment, the integrator may remove a low-frequency noise using a voltage difference between the sampled positive signal and the sampled negative signal.

In an exemplary embodiment, the integrator may generate a capacitive profile using the accumulated voltage signal.

In exemplary embodiments an electronic circuit for sensing input to a capacitive touch screen includes a charge to voltage converter to convert charge related to a difference in capacitance at an input of the charge to voltage converter to an output voltage signal corresponding to the difference in capacitance; a sample hold circuit to receive the voltage signal output from the charge to voltage converter and to convert the voltage signal to a differential voltage signal representative of the difference in capacitance; and an integrator circuit to receive the differential voltage signal from the sample hold circuit and to integrate the differential signal to produce an analog output signal representative of the difference in capacitance.

In exemplary embodiments an electronic circuit for sensing input to a capacitive touch screen includes an offset removal circuit connected to remove an offset at the input to the charge to voltage converter.

In exemplary embodiments an electronic circuit for sensing input to a capacitive touch screen includes a sample hold circuit that is a correlated double sampling circuit.

In exemplary embodiments an electronic circuit for sensing input to a capacitive touch screen includes the correlated double sampling circuit is configured to filter high frequency noise from the voltage signal.

In exemplary embodiments an electronic circuit for sensing input to a capacitive touch screen includes an integrator circuit configured to filter low frequency noise from the differential signal provided by the correlated double sampling circuit.

BRIEF DESCRIPTION OF THE DRAWINGS

The foregoing and other features and advantages of inventive concepts will be apparent from the more particular description of exemplary embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 4 is a timing diagram illustrating an operation of a receiver shown in FIG. 3;

FIG. 9A is a graph illustrating an amount of change of capacitance according to an X-axis line sensor shown in FIG. 2;

DETAILED DESCRIPTION OF THE EMBODIMENTS

Figure 1:
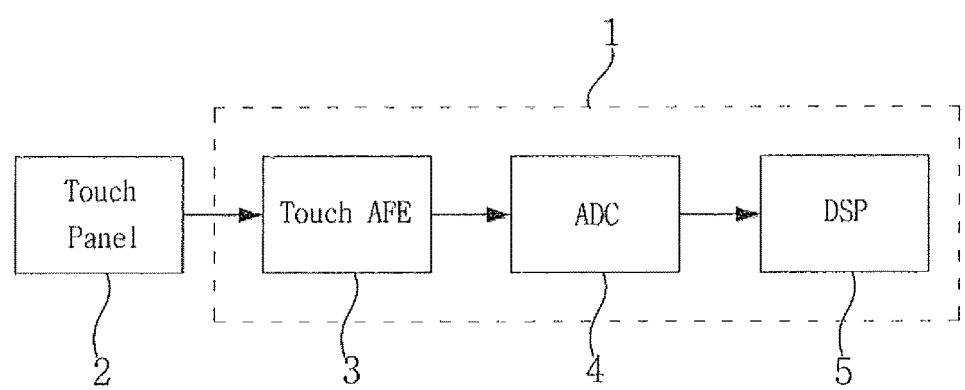
FIG. 1 is a block diagram illustrating a touch sensor controller according to an embodiment of the inventive concept.

Specific structural and functional details disclosed herein are merely representative for purposes of describing exemplary embodiments of inventive concepts, however, exemplary embodiments of inventive concepts may be embodied in many alternate forms and should not be construed as limited to exemplary embodiments of inventive concepts set forth herein. While inventive concepts are susceptible to various modifications and alternative forms, specific embodiments thereof are shown by way of example in the drawings and will herein be described in detail. It should be understood, however, that there is no intent to limit inventive concepts to the particular forms disclosed, but on the contrary, inventive concepts are to cover all modifications, equivalents, and alternatives falling within the spirit and scope of inventive concepts.

It will be understood that, although the terms first, second, A, B, etc. may be used herein in reference to elements of inventive concepts, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of inventive concepts is not intended to limit the scope of inventive concepts. The articles "a," "an," and "the" are singular in that they have a single referent, however the use of the singular form in the present document should not preclude the presence of more than one referent. In other words, elements of inventive concepts referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Meanwhile, when it is possible to implement any embodiment in any other way, a function or an operation specified in a specific block may be performed differently from a flow specified in a flowchart. For example, consecutive two blocks may actually perform the function or the operation simultaneously, and the two blocks may perform the function or the operation conversely according to a related operation or function.

Embodiments of the present inventive concept will be described below with reference to attached drawings.

FIG. 1 is a block diagram illustrating a touch sensor controller according to an exemplary embodiment of the inventive concept. An exemplary embodiment of a touch sensor controller 1 in accordance with principles of inventive concepts may receive a touch signal from a touch panel 2 and generate a digital input signal. The touch sensor controller 1 may include a touch analog front-end (AFE) 3, an analog-to-digital converter (ADC) 4, and a digital signal processor (DSP) 5, for example.

The touch AFE 3 may receive the touch signal from the touch panel 2 and process the received touch signal. The touch AFE 3 may transmit the processed touch signal to ADC 4. The ADC 4 may convert the processed touch signal into a digital signal. The ADC 4 may transmit the digital signal to the DSP 5. The DSP 5 may process the digital signal. In exemplary embodiments, the DSP 5 may be implemented with an ARM™ processor, for example.

The exemplary embodiment of touch AFE 3 in accordance with principles of inventive concepts will be described in greater detail in the discussion related to FIGS. 2 and 3.

Figure 2:
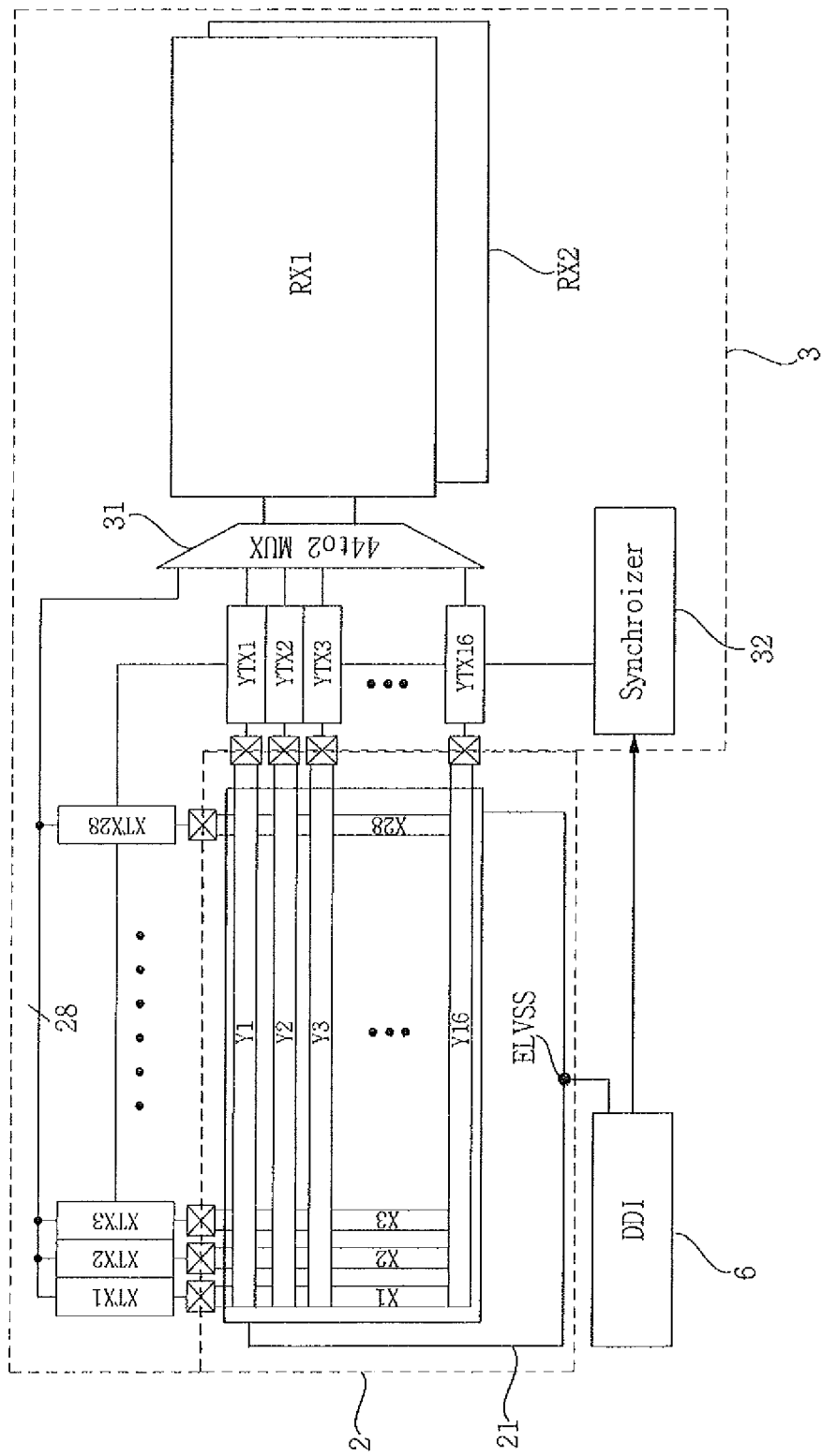
FIG. 2 is a block diagram illustrating a touch panel shown in FIG. 1.

FIG. 2 is a block diagram illustrating a touch panel shown in FIG. 1.

Referring to FIGS. 1 and 2, the touch panel 2 includes a plurality of X-axis line sensors (i.e., short-axis line sensors), a plurality of Y-axis line sensors (i.e., long-axis line sensors), and a VCOM plate 21.

The VCOM plate 21 is grounded with an ELVSS voltage. In exemplary embodiments, the ELVSS voltage may include a ground voltage. The VCOM plate 21 may be connected to a negative terminal of a battery in a mobile device, for example.

In this exemplary embodiment, the touch panel 2 may include first to twenty eighth X-axis line sensors X1 to X28 and first to sixteenth Y-axis line sensors Y1 to Y16.

The touch AFE 3 may include first to twenty eighth X-axis transmitters XTX1 to XTX28 for simultaneously charging the first to twenty eighth X-axis line sensors X1 to X28. The touch AFE 3 may include first to sixteenth Y-axis transmitters YTX1 to YTX16 for simultaneously charging the first to sixteenth Y-axis line sensors Y1 to Y16.

Touch AFE 3 may also include a multiplexer (MUX) 31 for selecting a pair of line sensors from among the first to twenty eighth X-axis line sensors X1 to X28 and the first to sixteenth Y-axis line sensors Y1 to Y16.

The touch AFE 3 may further include first and second receivers RX1 and RX2 for sensing, or receiving information from, the first to twenty eighth X-axis line sensors X1 to X28 and the first to sixteenth Y-axis line sensors Y1 to Y16. The first and second receivers RX1 and RX2 may sense each of a pair of line sensors at the same time.

The exemplary embodiment of touch AFE 3 in accordance with principles of inventive concepts may reduce the time required to sense all line sensors by grouping two line sensors.

The touch AFE 3 may further include a synchronizer 32 for generating a drive signal DV which drives each of the first to twenty eighth X-axis line sensors X1 to X28 and the first to sixteenth Y-axis line sensors Y1 to Y16.

A display driver integrated circuit (DDI) 6 may transmit a horizontal sync signal Hsync to a display panel and may be grounded to the VCOM plate 21. In exemplary embodiments, whenever an active matrix organic light-emitting diode (AMOLED) cell is charged in synchronization with the horizontal sync signal Hsync, display noise may be generated. To avoid, or mitigate, the display noise, the charge to voltage converter (C2V) converter 120 may operate in a "clean" interval; that is, one in which the display noise does not exist.

For example, the DDI 6 transmits the horizontal sync signal Hsync to the synchronizer 32. The synchronizer 32 transmits the horizontal sync signal Hsync to the first to twenty eighth X-axis transmitters XTX1 to XTX28 and the first to sixteenth Y-axis transmitters YTX1 to YTX16.

Each of the first to twenty eighth X-axis transmitters XTX1 to XTX28 may charge the first to twenty eighth X-axis line sensors X1 to X28 in synchronization with the horizontal sync signal Hsync. At the same time, each of the first to sixteenth Y-axis transmitters YTX1 to YTX16 may charge the first to sixteenth Y-axis line sensors Y1 to Y16 in synchronization with the horizontal sync signal Hsync.

After each of the first to twenty eighth X-axis transmitters XTX1 to XTX28 charges the first to twenty eighth X-axis line sensors X1 to X28 in synchronization with the horizontal sync signal Hsync and at the same time each of the first to sixteenth Y-axis transmitters YTX1 to YTX16 charges the first to sixteenth Y-axis line sensors Y1 to Y16 in synchronization with the horizontal sync signal Hsync, each of the first and second receivers RX1 and RX2 may sense a pair of the first to twenty eighth X-axis line sensors X1 to X28 and the first to sixteenth Y-axis line sensors Y1 to Y16.

As described above, a driving operation of the touch AFE 3 will be described in greater detail in the discussion related to FIGS. 3 and 4.

Figure 3:
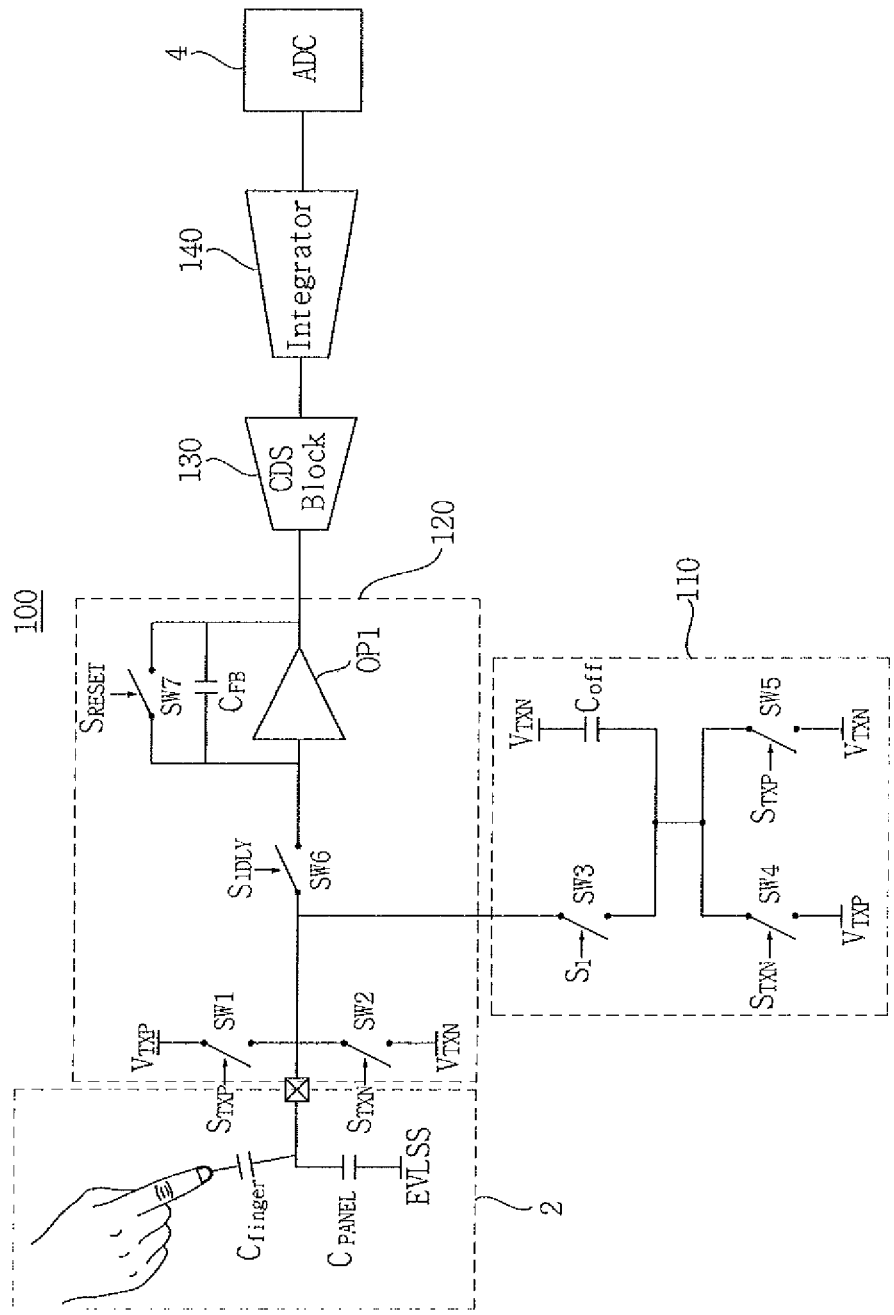
FIG. 3 is a block diagram illustrating a receiver shown in FIG. 2.

FIG. 3 is a block diagram illustrating a receiver shown in FIG. 2.

Referring to FIGS. 2 and 3, the touch panel 2 may be implemented as a panel capacitor Cpanel. When a finger is close to the touch panel 2 or touches the touch panel 2, the touch panel 2 may be modeled, as in FIG. 3, as a parallel connection between the panel capacitor Cpanel and a finger capacitor Cfinger.

The exemplary embodiment of receiver 100 in accordance with principles of inventive concepts may be one of the first and second receivers, for example.

In exemplary embodiments receiver 100 includes an offset removal unit 110, a charge-to-voltage (C2V) converter 120, a correlated double sampling (CDS) block 130, and an integrator 140.

The C2V converter 120 includes a first switch SW1 operated in response to a $S_{TXP}$ signal and a second switch SW2 operated in response to a $S_{TXN}$ signal.

When the $S_{TXP}$ signal is activated, the panel capacitor Cpanel is charged to a first voltage $V_{TXP}$. When the $S_{TXN}$ signal is activated, the panel capacitor Cpanel is charged to a second voltage $V_{TXN}$. Typically, both signals ($S_{TXP}$ and $S_{TXN}$) are not activated simultaneously.

The offset removal unit 110 may remove an effect by the panel capacitor Cpanel in the touch panel 2. That is, in exemplary embodiments, offset removal unit 110 may include an offset capacitor Coff having the same capacitance as the panel capacitor Cpanel, for example.

When a hover touch event occurs (i.e., a proximity event in which, for example, a user's finger approaches the panel), the offset capacitor Coff may have an inverse charge with the panel capacitor Cpanel. That is, the receiver 100 may be configured to maintain the output of the receiver 100 as 0V when a proximity event occurs. In exemplary embodiments, offset removal unit 110 includes third to fifth switches SW3 to SW5 and the offset capacitor Coff. An exemplary method of operating the offset removal unit 110 in accordance with principles of inventive concepts will be described in greater detail in the discussion related to FIGS. 7 and 8.

The C2V converter 120 converts information about change of capacitance received from the touch panel 2 into a voltage signal.

The CDS block 130 in accordance with principles of inventive concepts may remove noise from the voltage signal. In exemplary embodiments, the CDS block 130 may be implemented with a sample-and-hold amplifier. In particular, the CDS block 130 may include a first SHA filter for sampling a positive signal from the voltage signal and a second SHA filter for sampling a negative signal from the voltage signal. In exemplary embodiments, the CDS block 130 may operate as an anti-aliasing filter.

In accordance with principles of inventive concepts, integrator 140 may accumulate a voltage difference between the sampled positive signal and the sampled negative signal. Further, the integrator 140 may accumulate the sampled voltage signal, reduce bandwidth with respect to the voltage signal, and increase sensitivity of the voltage signal.

FIG. 4 is a timing diagram illustrating an exemplary operation of a receiver shown in FIG. 3 in accordance with principles of inventive concepts.

Referring to FIGS. 3 and 4, display noise may occur whenever a horizontal sync signal Hsync is activated, for example.

At time T1, when a $S_{RESET}$ signal is activated, the seventh switch SW7 is in an on, or activated state in which it is closed. Whenever the seventh switch SW7 is activated, the first OP-AMP OP1 is reset. That is, the input and output of the first OP-AMP OP1 have the same voltage level.

At time T1, when a $S_{TXP}$ signal is activated, the first switch SW1 and the fifth switch SW5 are activated, closed, in on states. Whenever the first switch SW1 is activated, the panel capacitor Cpanel is charged with the first voltage $V_{TXP}$. Whenever the fifth switch SW5 is activated, the offset capacitor Coff is discharged.

At time T2, when signal $S_1$ is activated, the third switch SW3 is closed.

The offset removal unit 110 may set the offset capacitor Coff to have equal charge having opposite polarity to the panel capacitor Cpanel. Accordingly, when the second switch SW2 is activated, charge of the panel capacitor Cpanel and charge of the offset capacitor Coff are cancelled with each other, or offset one another.

At time T3, when a $S_{IDLY}$ signal is activated, the sixth switch SW6 is closed, and in exemplary embodiments a charge with respect to an amount of change of capacitance by a proximity operation or a touch operation is stored in feedback capacitor Cfb.

At time T4, when a $S_{RESET}$ signal is activated, the seventh switch SW7 is closed and the first OP-AMP OP1 is reset.

At time T4, when a $S_{TXN}$ signal is activated, the second switch SW2 and the fourth switch SW4 are closed. Whenever the second switch SW2 is activated, the panel capacitor Cpanel is discharged. Whenever the fourth switch SW4 is activated, the offset capacitor Coff is charged with the first voltage $V_{TXP}$.

Figure 5A:
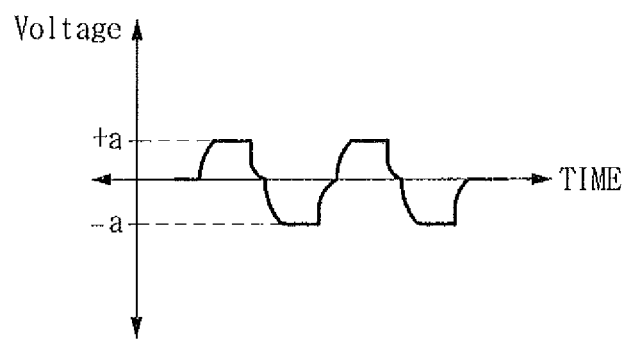
FIG. 5A is a timing diagram illustrating output of the C2V converter shown in FIG. 3.

FIG. 5A is a timing diagram illustrating output of the C2V converter shown in FIG. 3.

Figure 5B:
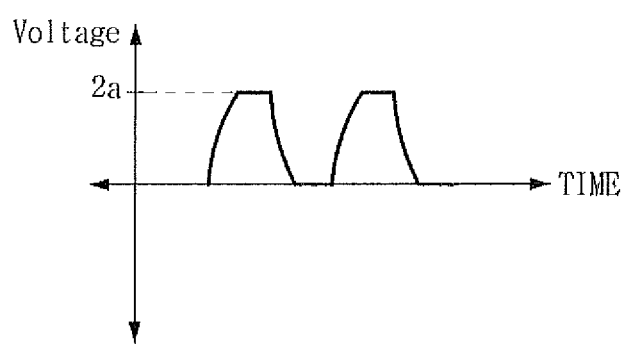
FIG. 5B is a timing diagram illustrating output of the CDS block shown in FIG. 3.
Figure 5C:
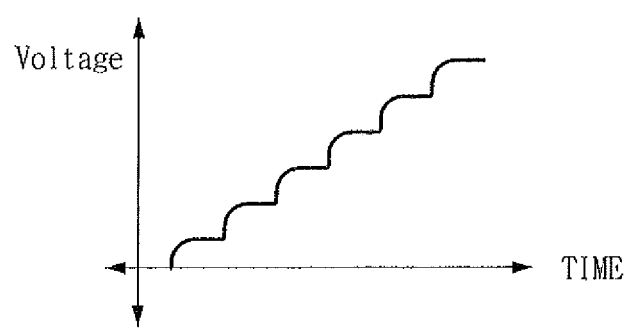
FIG. 5C is a timing diagram illustrating output of the integrator shown in FIG. 3.

In FIGS. 4 through 5C, the abscissa axis denotes time and the ordinate axis denotes voltage. The C2V converter 120 may output a bipolar voltage signal ranging between a positive voltage level and a negative voltage level. For example, the C2V converter 120 may output a voltage signal ranging between +a V and −a V, as in FIG. 5A.

FIG. 5B is a timing diagram illustrating output of the CDS block shown in FIG. 3. In exemplary embodiments, while the C2V converter 120 may provide a bipolar signal ranging between ±a V, the CDS block 130 may output a unipolar voltage signal ranging between 0 V and 2 aV.

FIG. 5C is a timing diagram illustrating output of the integrator shown in FIG. 3. In accordance with principles of inventive concepts, integrator 140 may accumulate output of the CDS block 130 to gradually increase as illustrated in FIG. 5C.

Figure 6A:
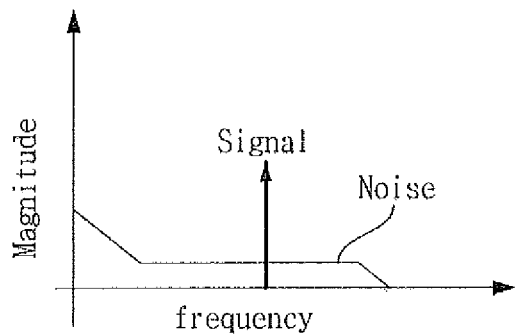
FIG. 6A is a graph illustrating a signal characteristic of a noise according to a frequency and a C2V converter.
Figure 6B:
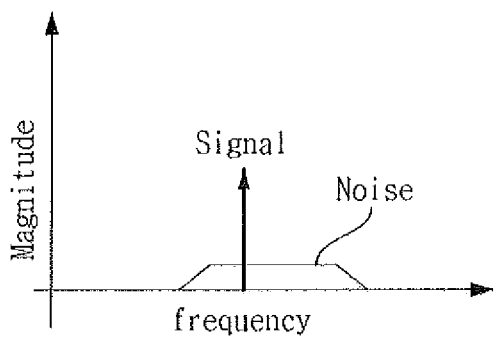
FIG. 6B is a graph illustrating a signal characteristic of an output signal of a receiver according to a frequency.
Figure 6C:
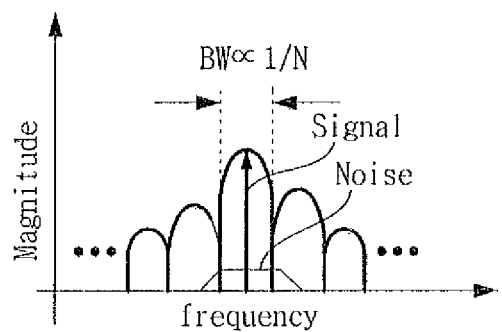
FIG. 6C is a graph illustrating a signal characteristic of an integrator according to a frequency.

FIGS. 6A to 6C are graphs illustrating signal characteristic of a receiver in a frequency domain in which magnitude (of signal and noise) is displayed on the ordinate axis and frequency on the abscissa axis.

FIG. 6A is a graph illustrating a signal characteristic of C2V converter noise in the frequency domain.

Generally, a hover or a touch signal may include significant noise in a low-frequency band and a constant, intermediate level, noise may be uniformly distributed in a wide mid-frequency band. The output of the C2V converter 120 may be generated in a specific frequency band.

FIG. 6B is a graph illustrating a signal characteristic of an output signal of a receiver in the frequency domain. In exemplary embodiments in accordance with principles of inventive concepts CDS block 130 may remove high-frequency noise by sampling the positive signal and the negative signal. Both the sampled positive and negative signals may include low-frequency noise. The low-frequency noise included in the sampled positive signal may be very similar to the low-frequency noise included in the sampled negative signal. Accordingly, the integrator 140 may remove low-frequency noise using the voltage difference between the sampled positive signal and the sampled negative signal. Accordingly, the receiver 100 may perform a band pass filter (BPH) function and output signal of the receiver may be only output in the filtered bandwidth.

FIG. 6C is a graph illustrating a signal characteristic of an integrator according to a frequency.

As the number N of sample increase, the bandwidth BW of an output signal of the integrator 140, which is proportional to 1/N, may become smaller. As a bandwidth is reduced, noise is reduced in an output signal of the receiver 100. That is, in accordance with principles of inventive concepts, integrator 140 may filter noise of frequencies outside the bandwidth (BW) of the output signal.

Figure 7:
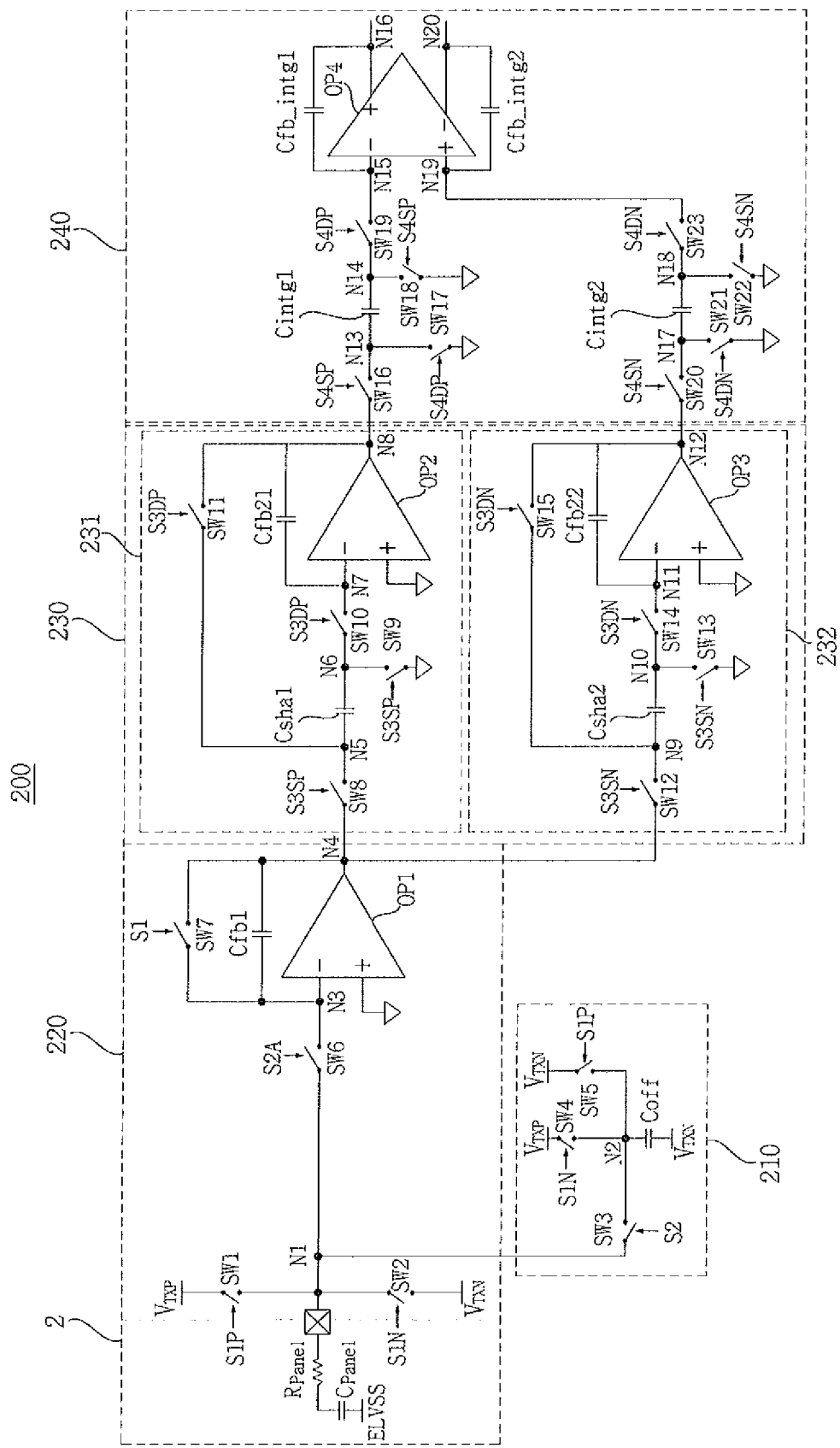
FIG. 7 is a circuit illustrating a receiver according to another embodiment of the inventive concept.

FIG. 7 is a circuit illustrating an exemplary embodiment of a receiver 200 in accordance with principles of inventive concepts.

Referring to FIG. 7, a touch panel 2 may be implemented with a panel capacitor Cpanel and a panel resistor Rpanel, with the panel capacitor Cpanel and the panel resistor Rpanel connected in series. An EVLSS voltage may be applied to one terminal of the touch panel 2 and the C2V converter 220 may be connected to the other terminal of the touch panel 2.

The receiver 200 includes an offset removal unit 210, a C2V converter 220, a CDS block 230, and an integrator 240.

The offset removal unit 210 may remove an offset caused by the panel capacitor Cpanel. The offset removal unit 210 includes third to fifth switches SW3 to SW5 and an offset capacitor Coff.

The C2V converter 220 includes a first switch SW1 operated in response to control signal S1P and a second switch SW2 operated in response to control signal S N. The first switch SW1 is connected between a node where a first voltage $V_{TXP}$ is applied and a first node N1. The second switch SW2 is connected between the first node N1 and a node where a second voltage $V_{TXN}$ is applied.

When the S1P signal is activated, the panel capacitor Cpanel is charged with the first voltage $V_{TXP}$ through switch SW1. Conversely, when the S1N signal is activated, the panel capacitor Cpanel is charged with the second voltage $V_{TXN}$ through switch SW2

In exemplary embodiments in accordance with principles of inventive concepts, the offset capacitor Coff may be of the same capacitance as the panel capacitance Cpanel. In order to ensure that the capacitance of offset capacitor Coff is equal to the panel capacitance Cpanel (that is, the capacitance of the touch panel), the capacitance of Coff may be adjusted during a fabrication/calibration phase, for example.

The third switch SW3 is connected between the first node N1 and a second node N2 and operates in response to a S2 signal. The fourth switch SW4 is connected between the node where the first voltage $V_{TXP}$ is applied and the second node N2 and operates in response to a S1N signal. The fourth switch SW4 may charge the offset capacitor Coff in response to a S1N signal. The fifth switch SW5 is connected between the node where the second voltage $V_{TXN}$ is applied and the second node N2 and operates in response to an S1P signal. The fifth switch SW5 may discharge the offset capacitor Coff in response to the S1P signal. In exemplary embodiments switches SW1 and SW2 are not activated, or "on," at the same time.

The offset removal unit 210 may set the offset capacitor Coff to have the charge having an inverse sign from that of panel capacitor Cpanel. That is, the panel capacitor Cpanel and the offset capacitor Coff may have the same amount of charge, but opposite sign, or polarity.

In exemplary embodiments C2V converter 220 includes sixth and seventh switches SW6 and SW7, a C2V feedback capacitance Cfb1, and a first operational amplifier (OP-AMP) OP1.

The sixth switch SW6 is connected between the first node N1 and a third node N3 and operates in response to a S2A signal. The seventh switch SW7 is connected between the third node N3 and a fourth node N4 and operates in response to a S1 signal. The C2V feedback capacitance Cfb1 is connected between the third node N3 and the fourth node N4.

A ground voltage is applied to a positive, or non-inverting, input terminal of the first OP-AMP OP1. A negative, or inverting, input terminal of the first OP-AMP OP1 is connected to the third node N3. The output terminal of the first OP-AMP OP1 is connected to the fourth node N4.

In exemplary embodiments in accordance with principles of inventive concepts CDS block 230 may divide a voltage signal transmitted from the C2V converter 220 into a positive signal and a negative signal and separately process each of the divided signals. The CDS block 230 may be implemented using two sample-and-hold amplifiers (SHAs). That is, CDS block 230 may include a first SHA filter 231 for filtering the positive signal and a second SHA filter 232 for filtering the negative signal.

The first SHA filter 231 may sample and hold the positive signal to remove high frequency noise included in the positive signal.

The second SHA filter 232 may sample and hold the negative signal to remove high frequency noise included in the negative signal.

The first SHA filter 231 includes eighth to eleventh switches SW8 to SW11, a first SHA capacitor Csha1, a positive feedback capacitor Cfb21, and a second OP-AMP OP2.

The eighth switch SW8 is connected between the fourth node N4 and a fifth node N5 and operates in response to signal S3SP. The ninth switch SW9 is connected between a sixth node N6 and the node where a ground voltage is applied and operates in response to signal S3SP. The tenth switch SW10 is connected between the sixth node N6 and a seventh node N7 and operates in response to signal S3DP. The eleventh switch SW11 is connected between the fifth node N5 and an eighth node N8 and operates in response to signal S3DP.

The first SHA capacitor Csha1 is connected between the fifth node N5 and the sixth node N6. The positive feedback capacitor Cfb21 is connected between the seventh node N7 and the eighth node N8.

A ground voltage is applied to a positive, or non-inverting, input terminal of the second OP-AMP OP2. A negative, or inverting, input terminal of the second OP-AMP OP2 is connected to the seventh node N7. An output terminal of the second OP-AMP OP2 is connected to the eighth node N8.

The second SHA filter 232 includes twelfth to fifteenth switches SW12 to SW15, a second SHA capacitor Csha2, a negative feedback capacitor Cfb22, and a third OP-AMP OP3.

The twelfth switch SW12 is connected between the fourth node N4 and a ninth node N9 and operates in response to signal S3SN. The thirteenth switch SW13 is connected between a tenth node N10 and the node where a ground voltage is applied and operates in response to signal S3SN. The fourteenth switch SW14 is connected between the tenth node N10 and an eleventh node N11 and operates in response to signal S3DN. The fifteenth switch SW15 is connected between the ninth node N9 and an twelfth node N12 and operates in response to signal S3DN.

The second SHA capacitor Csha2 is connected between the ninth node N9 and the tenth node N10. The negative feedback capacitor Cfb22 is connected between the eleventh node N11 and the twelfth node N12.

A ground voltage is applied to a positive, or non-inverting, input terminal of the third OP-AMP OP3. A negative, or inverting, input terminal of the third OP-AMP OP3 is connected to the eleventh node N11. An output terminal of the third OP-AMP OP3 is connected to the twelfth node N12.

The integrator 240 may accumulate a voltage difference between outputs of the first SHA filter 231 and the second SHA filter 232. For example, each of the output of the first SHA filter 231 and the output of the second SHA filter 232 may include a low-frequency noise. In exemplary embodiments the low-frequency noise included in each thereof is nearly identical and, in accordance with principles of inventive concepts, the integrator 240 may remove a low-frequency noise by accumulating the voltage difference between the outputs of the first SHA filter 231 and second SHA filter 232.

In accordance with principles of inventive concepts, integrator 240 includes sixteenth to twenty third switches SW16 to SW23, a first integrator capacitor Cintg1, a second integrator capacitor Cintg2, a first integrator feedback capacitor Cfb_intg1, a second integrator feedback capacitor Cfb_intg2, and a fourth OP-AMP OP4.

The sixteenth switch SW16 is connected between the eighth node N8 and a thirteenth node N13 and operates in response to signal S4SP. The seventeenth switch SW17 is connected between the thirteenth node N13 and the node where a ground voltage is applied and operates in response to signal S4DP. The eighteenth switch SW18 is connected between a fourteenth node N14 and the node where a ground voltage is applied and operates in response to signal S4SP. The nineteenth switch SW19 is connected between the fourteenth node N14 and a fifteenth node N15 and operates in response to signal S4DP.

The twentieth switch SW20 is connected between the twelfth node N12 and a seventeenth node N17 and operates in response to signal S4SN. The twenty first switch SW21 is connected between the seventeenth node N17 and the node where a ground voltage is applied and operates in response to signal S4DN. The twenty second switch SW22 is connected between a eighteenth node N18 and the node where a ground voltage is applied and operates in response to signal S4SN. The twenty third switch SW23 is connected between the eighteenth node N18 and a nineteenth node N19 and operates in response to signal S4SN.

The first integrator capacitor Cintg1 is connected between the thirteenth node N13 and the fourteenth node N14. The second integrator capacitor Cintg2 is connected between the seventeenth node N17 and the eighteenth node N18.

The first integrator feedback capacitor Cfb_intg1 is connected between the fifteenth node N15 and the sixteenth node N16. The second integrator feedback capacitor Cfb_intg2 is connected between the nineteenth node N19 and the twentieth node N20.

A positive, or non-inverting, input terminal of the fourth OP-AMP OP4 is connected to the nineteenth node N19. A negative, or inverting, input terminal of the fourth OP-AMP OP4 is connected to the fifteenth node N15. A positive output terminal of the fourth OP-AMP OP4 is connected to the sixteenth node N16. A negative output terminal of the fourth OP-AMP OP4 is connected to the twentieth node N20.

Operation of each of the C2V converter 220, the correlated double sampling CDS block 230, and the integrator 240 in accordance with principles of inventive concepts will be described in greater detail in the discussion related to FIG. 8.

Figure 8:
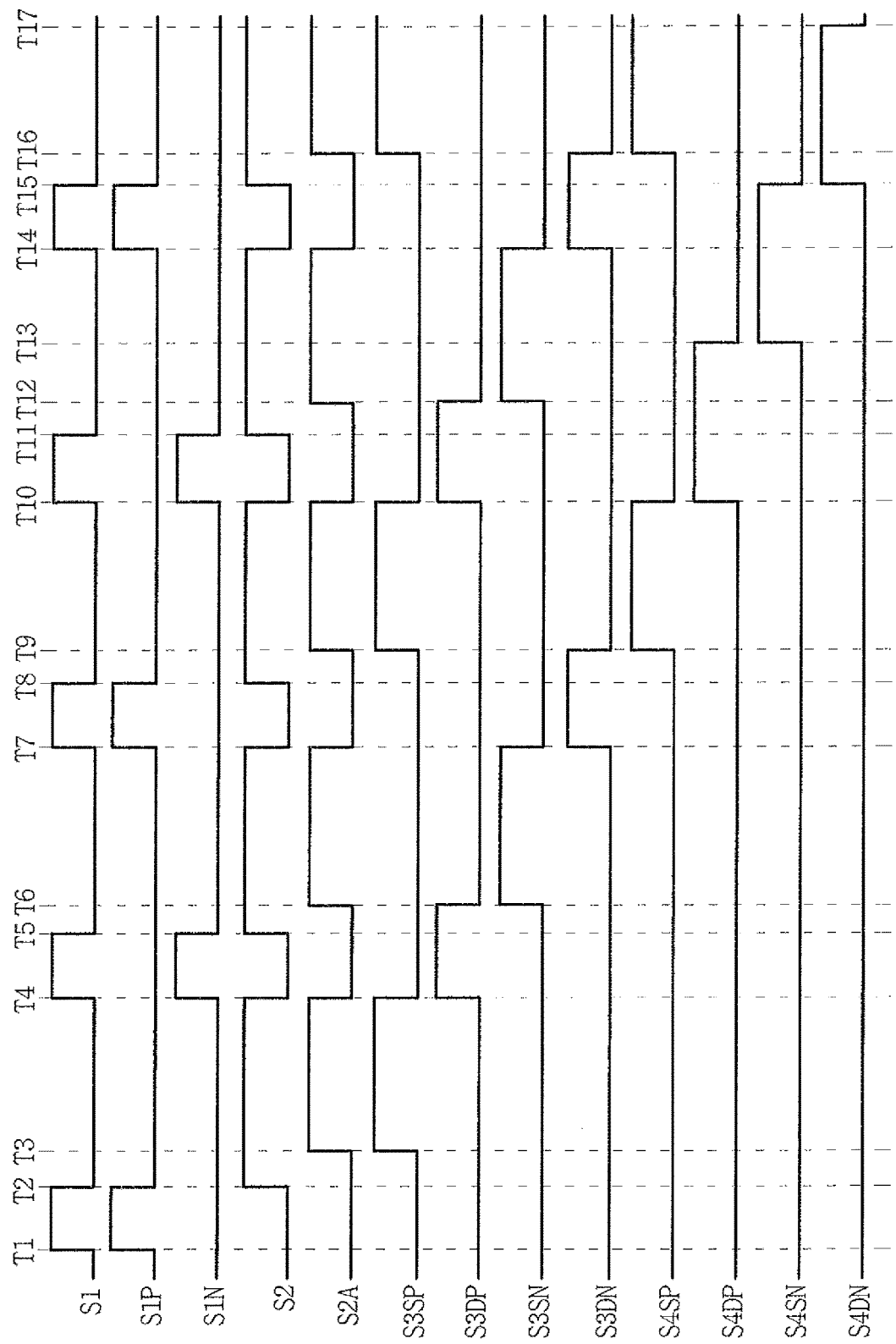
FIG. 8 is a timing diagram illustrating an operation of the receiver shown in FIG. 7.

FIG. 8 is a timing diagram illustrating operation of a receiver in accordance with principles of inventive concepts, such as that shown in FIG. 7.

Referring to FIGS. 7 and 8, from time T1 to time T2, when signal S1 is activated, the seventh switch SW7 is in an on state. Whenever the seventh switch SW7 is activated, the first OP-AMP OP1 is reset. That is, the third node N3 which is a negative, or inverting, input of the first OP-AMP OP1 and the fourth node N4 which is output of the first OP-AMP OP1 have no potential difference.

From time T1 to time T2, when signal S1P is activated, the first switch SW1 and the fifth switch SW5 are in on states. Whenever the first switch SW1 is activated, the panel capacitor Cpanel is charged by the first voltage $V_{TXP}$. Whenever the fifth switch SW5 is activated, the panel capacitor Cpanel is discharged.

From time T2 to time T4, when signal S2 is activated, the third switch SW3 is in an on state. The offset removal unit 210 may set the offset capacitor Coff to have an equal amount of charge as, but of the opposite polarity from, the panel capacitor Cpanel. In accordance with principles of inventive concepts, when the second switch SW2 is activated, charge of the panel capacitor Cpanel and charge of the offset capacitor Coff cancel one another.

From time T3 to time T4, when signal S2A and signal S3SP are activated, the sixth switch SW6, the eighth switch SW8, and the ninth switch SW9 are in on states. In exemplary embodiments, charges with respect to an amount of change of capacitance by a proximity operation or a touch operation are stored in a C2V feedback capacitor Cfb1. Additionally, charges stored in the C2V feedback capacitor Cfb are charged in the first SHA capacitor Csha1.

From time T4 to time T5, when an S1 signal is activated, the seventh switch SW7 is in an on state. Whenever the seventh switch SW7 is activated, the first OP-AMP OP1 is reset.

From time T4 to time T5, when an S1N signal is activated, the second switch SW2 and the fourth switch SW4 are in on states. Whenever the second switch SW2 is activated, the panel capacitor Cpanel is discharged and whenever the fourth switch SW4 is activated, the offset capacitor Coffset is charged by the first voltage $V_{TXP}$.

From time T4 to time T6, when signal S3DP is activated, the tenth switch SW10 and the eleventh switch SW11 are in on states. In exemplary embodiments charges stored in the first SHA capacitor Csha1 are charged in the positive feedback capacitor Cfb21.

From time T6 to time T7, when signals S2A and S3SN are activated, the sixth switch SW6, the twelfth switch SW12, and the thirteenth switch SW13 are in on states. In exemplary embodiments charges with respect to an amount of change of capacitance by a proximity operation or a touch operation are stored in the C2V feedback capacitor Cfb1. Additionally, charges stored in the C2V feedback capacitor Cfb1 are charged in the second SHA capacitor Csha2.

From time T7 to time T9, when signal S3DN is activated, the fourteenth switch SW14 and the fifteenth switch SW15 are in on states. In exemplary embodiments charges stored in the second SHA capacitor Csha2 are charged in the negative feedback capacitor Cfb22.

From time T9 to time T10, when signal S4SP is activated, the sixteenth switch SW16 and the eighteenth switch SW18 are in on states. In exemplary embodiments charges stored in the positive feedback capacitor Cfb21 are charged in the first integrator capacitor Cintg1.

From time T10 to time T13, when signal S4DP is activated, the seventeenth switch SW17 and the nineteenth switch SW19 are in on states. In exemplary embodiments charges stored in the first integrator capacitor Cintg1 are charged in the first integrator feedback capacitor Cfb_intg1.

From time T13 to time T15, when signal S4SN is activated, the twentieth switch SW20 and the twenty second switch SW22 are in on states. In exemplary embodiments charges stored in the negative feedback capacitor Cfb22 are charged in the second integrator capacitor Cintg2.

From time T15 to time T17, when signal S4DN is activated, the twenty first switch SW21 and the twenty third switch SW23 are in on states. In exemplary embodiments charges stored in the second integrator capacitor Cintg2 are charged in the second integrator feedback capacitor Cfb_intg2.

FIG. 9A is a graph illustrating a response to a change in capacitance due to a human finger hovering over a touch-sensitive display in accordance with principles of inventive concepts. In this exemplary embodiment, a finger hovers near the center of the screen and, as a result, the greatest change in capacitance coincides with X-axis line sensors at the middle of the array of X-axis line sensors (X7 and X8 in this exemplary embodiment) shown in FIG. 2.

Referring to FIGS. 2 and 9A, an integrator in accordance with principles of inventive concepts, such as integrator 140 shown in FIG. 3, may generate a capacitive profile using an accumulated voltage signal.

In this exemplary embodiment, the abscissa axis denotes first to fourteenth X-axis line sensors X1 to X14 of the first to twenty eighth X-axis line sensors X1 to X28. The ordinate axis denotes an analog-to-digital conversion (ADC) code, where the capacitive profile is converted into a digital value. The capacitive profile may be generated at a hovered position for example.

The first capacitive profile curve SC1 is displayed when a user performs a hover touch on the touch panel 2 at a height of 2 mm. The second capacitive profile curve SC2 is displayed when a user performs a hover touch on the touch panel 2 at a height of 5 mm. The third capacitive profile curve SC3 is displayed when a user performs a hover touch on the touch panel 2 at a height of 10 mm. The fourth capacitive profile curve SC4 is displayed when a user performs a hover touch on the touch panel 2 at a height of 20 mm.

That is, as the hover touch is close to the touch panel 2, the amount of change of capacitance increases.

Figure 9B:
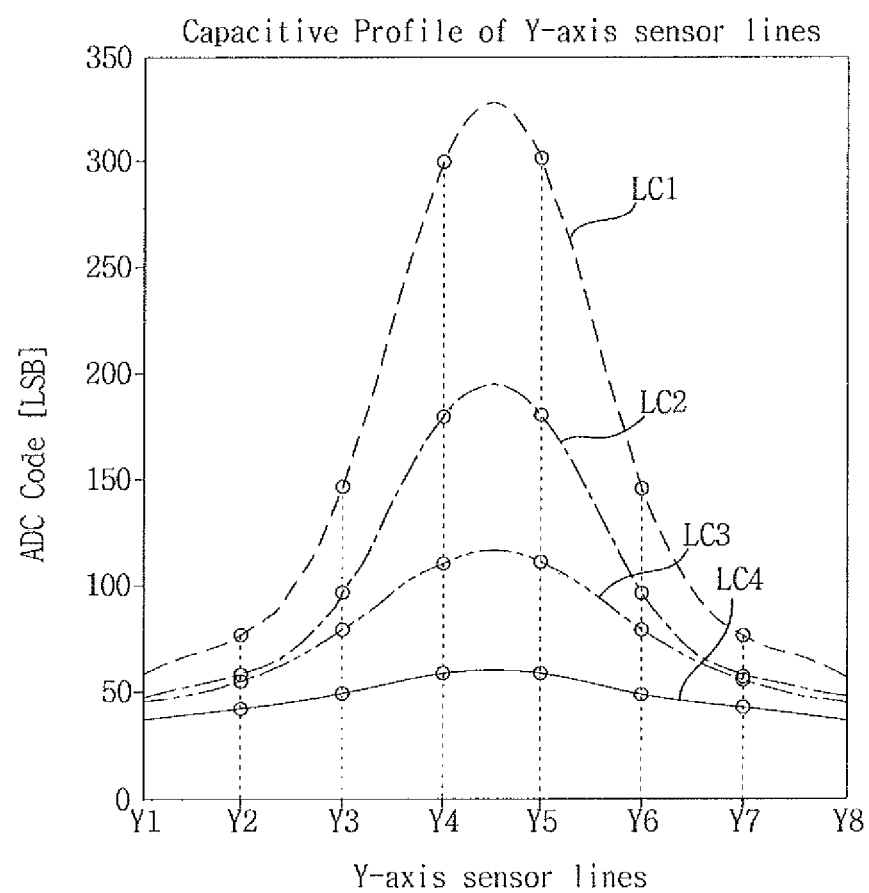
FIG. 9B is a graph illustrating an amount of change of capacitance according to a Y-axis line sensor shown in FIG. 2.

Similarly, FIG. 9B is a graph illustrating a response to a change in capacitance due to a human finger hovering over a touch-sensitive display in accordance with principles of inventive concepts. In this exemplary embodiment, a finger hovers near the center of the screen and, as a result, the greatest change in capacitance coincides with Y-axis line sensors at the middle of the array of Y-axis line sensors (Y4 and Y5 in this exemplary embodiment) shown in FIG. 2.

Referring to FIGS. 2 and 9B, the abscissa axis denotes first to eighth Y-axis line sensors Y1 to Y8 of the first to sixteenth Y-axis line sensors Y1 to Y16 and the ordinate axis denotes an ADC code where the capacitive profile is converted into a digital value. The capacitive profile may be generated at a hovered position for example.

The first capacitive profile curve LC1 is displayed when a user performs a hover touch on the touch panel 2 at a height of 2 mm. The second capacitive profile curve LC2 is displayed when a user performs a hover touch on the touch panel 2 at a height of 5 mm. The third capacitive profile curve LC3 is displayed when a user performs a hover touch on the touch panel 2 at a height of 10 mm. The fourth capacitive profile curve LC4 is displayed when a user performs a hover touch on the touch panel 2 at a height of 20 mm.

That is, as the hover touch is close to the touch panel 2, the amount of change of capacitance increases.

Figure 9C:
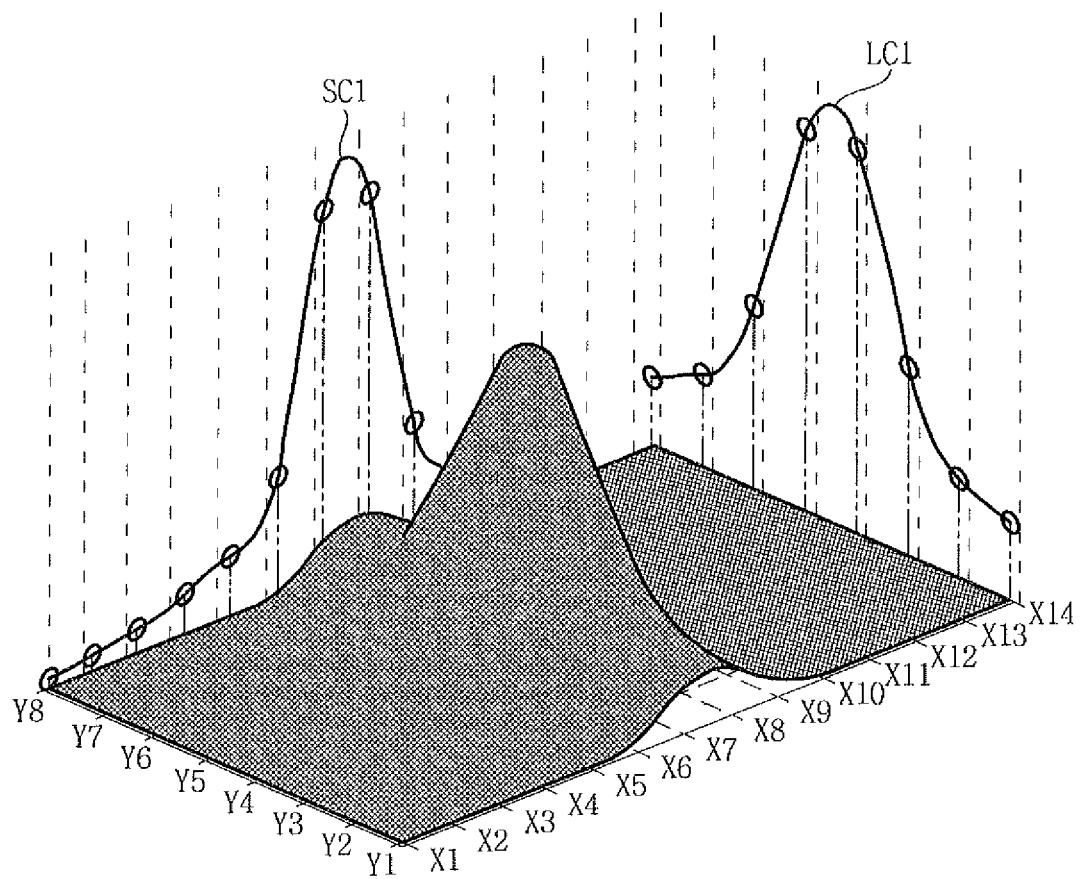
FIG. 9C is a 3-dimensional graph illustrating an amount of change of capacitance according to the X-axis line sensor and the Y-axis line sensor shown in FIG. 2.

FIG. 9C is a 3-dimensional graph illustrating the amount of change of capacitance according to the combined X-axis line sensor and the Y-axis line sensor shown in FIG. 2.

The first capacitive profile curve SC1 is displayed when a user performs a hover touch on the touch panel 2 at a height of 2 mm. The first capacitive profile curve LC1 is displayed when a user performs a hover touch on the touch panel 2 at a height of 2 mm.

The 3-dimensional graph shown in FIG. 9C may be generated using the first capacitive profile curve SC1 shown in FIG. 9A and the first capacitive profile curve LC1 shown in FIG. 9B.

Figure 10A:
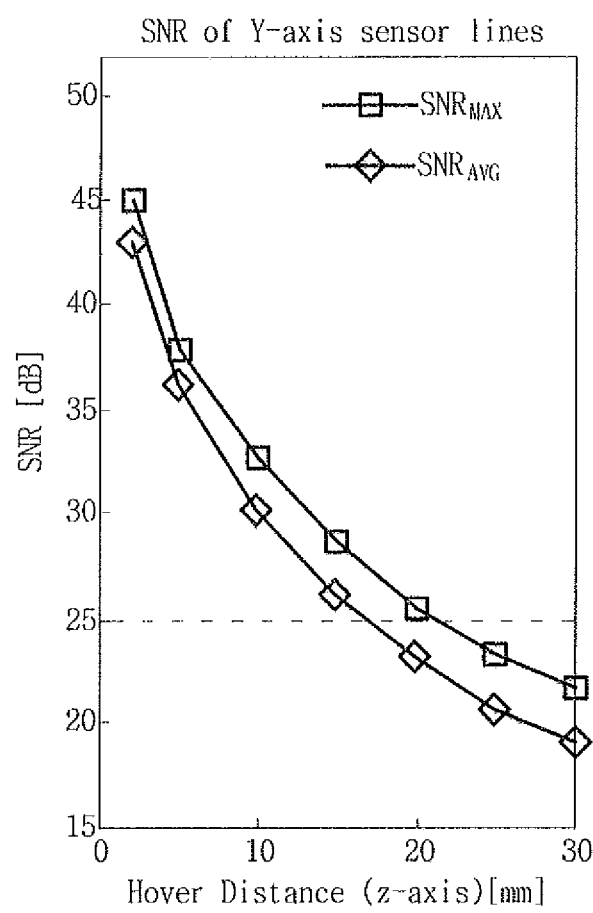
FIG. 10A is a graph illustrating a signal-to-noise ratio (SNR) according to a hover distance in the X-axis line sensor shown in FIG. 2.

FIG. 10A is a graph illustrating a signal-to-noise ratio (SNR) according to a hover distance in the X-axis line sensor shown in FIG. 2.

Referring to FIGS. 2 and 10A, the abscissa axis denotes a hover distance of a hover touch and the ordinate axis denotes an SNR according to the hover distance based on the X-axis line sensor.

The graph shown in FIG. 10A denotes an average value $SNR_{AVG}$ and a maximum value $SNR_{MAX}$ of the SNR according to the hover distance. In operation a threshold SNR may be arbitrarily set to 25 dB, for example.

Figure 10B:
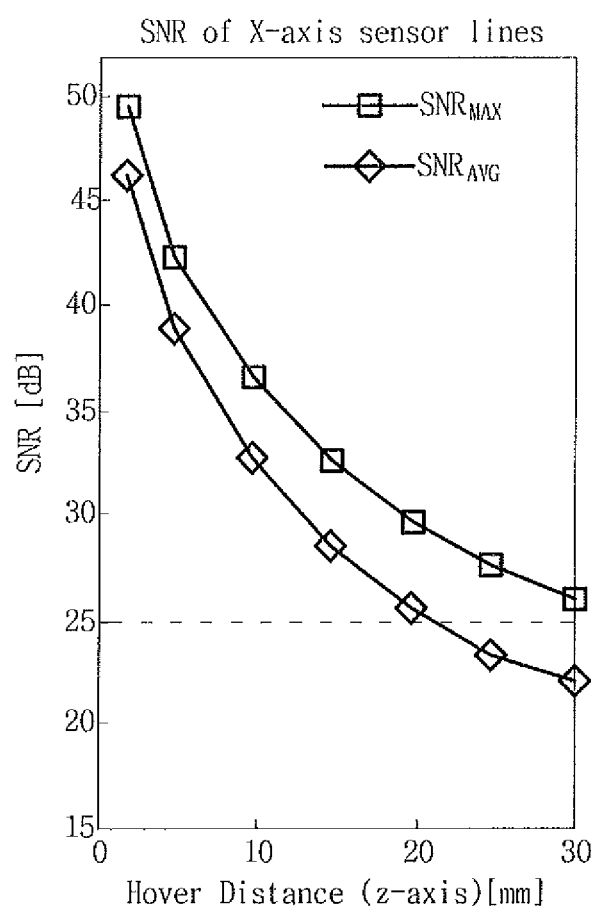
FIG. 10B is a graph illustrating an SNR according to a hover distance in the Y-axis line sensor shown in FIG. 2.

FIG. 10B is a graph illustrating an SNR according to a hover distance in the Y-axis line sensor shown in FIG. 2.

Referring to FIGS. 2 and 10B, the abscissa axis denotes a hover distance of a hover touch and the ordinate axis denotes an SNR according to the hover distance based on the Y-axis line sensor.

The graph shown in FIG. 1 0A denotes an average value $SNR_{AVG}$ and a maximum value $SNR_{MAX}$ of the SNR according to the hover distance. In exemplary embodiments, a threshold SNR may be arbitrarily set to 25 dB, for example.

Figure 11:
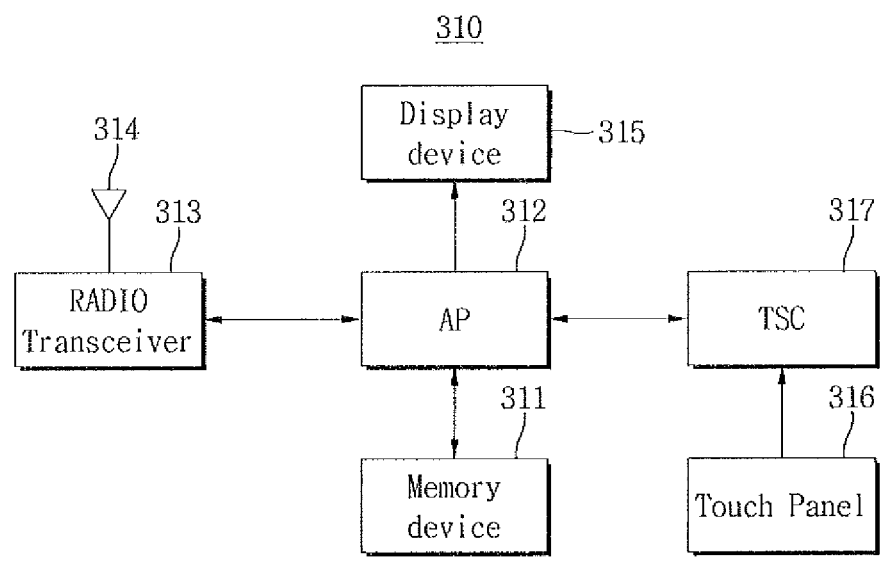
FIG. 11 is a block diagram illustrating an electronic system 310 including a touch sensor controller (TSC) shown in FIG. 1 in accordance with an embodiment of the inventive concept.

FIG. 11 is a block diagram illustrating an electronic system 310 including a touch sensor controller in accordance with principles of inventive concepts, such as the touch sensor controller (TSC) shown in FIG. 1.

Referring to FIG. 11, the electronic system 310 includes a memory device 311, an application processor (AP) 312 including a memory controller for controlling the memory device 311, a radio transceiver 313, an antenna 314, a display device 315, a touch panel 316, and a TSC 317.

The radio transceiver 313 may transmit and receive a radio signal through the antenna 314. For example, the radio transceiver 313 may convert the radio signal received through the antenna 314 into a signal to be processed in the AP 312.

Accordingly, the AP 312 may process a signal outputted from the radio transceiver 313, and transmit the processed signal to the display device 315. Further, the radio transceiver 313 may convert the signal outputted from the AP 312 into the radio signal, and transmits the converted radio signal to an external device through the antenna 314.

The touch panel 316 may receive a touch signal from a user. The touch panel 316 converts the touch signal into the amount of change of capacitance. The touch panel 316 transmits information about the amount of change of capacitance to the TSC 317. The TSC 317 converts the information about the amount of change of capacitance into coordinate information. The TSC 317 transmits the coordinate information to the AP 312.

In exemplary embodiments, the TSC 317 may include the TSC 1 shown in FIG. 1, for example.

Figure 12:
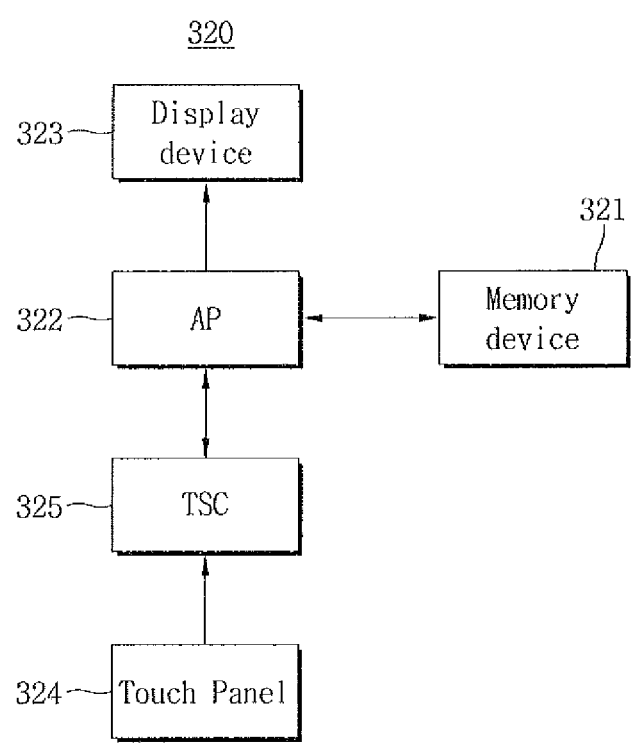
FIG. 12 is a block diagram illustrating an electronic system 320 including the TSC shown in FIG. 1 in accordance with another embodiment of the inventive concept.

FIG. 12 is a block diagram illustrating an electronic system 320 including the TSC shown in FIG. 11 in accordance with another exemplary embodiment of in accordance with principles of inventive concepts.

Referring to FIG. 12, the electronic system 320 may be a personal computer (PC), a network server, a tablet PC, a netbook, an e-reader, a personal digital assistant (PDA), a portable multimedia player (PMP), an MP3 player, or an MP4 player, for example.

The electronic system 320 includes a memory device 321, an AP 322 including a memory controller for controlling a data processing operation of the memory device 321, a display device 323, a touch panel 324, and a TSC 325.

The touch panel 324 may receive a touch signal from a user. The touch panel 324 converts the touch signal into the amount of change of capacitance. The touch panel 324 transmits information about the amount of change of capacitance to the TSC 325. The TSC 325 converts the information about the amount of change of capacitance into coordinate information. The TSC 325 transmits the coordinate information to the AP 322.

The AP 322 displays data stored in the memory device 321 through the display device 323 according to data inputted through the touch panel 324.

In exemplary embodiments, the TSC 325 may include the TSC 1 shown in FIG. 1, for example.

Figure 13:
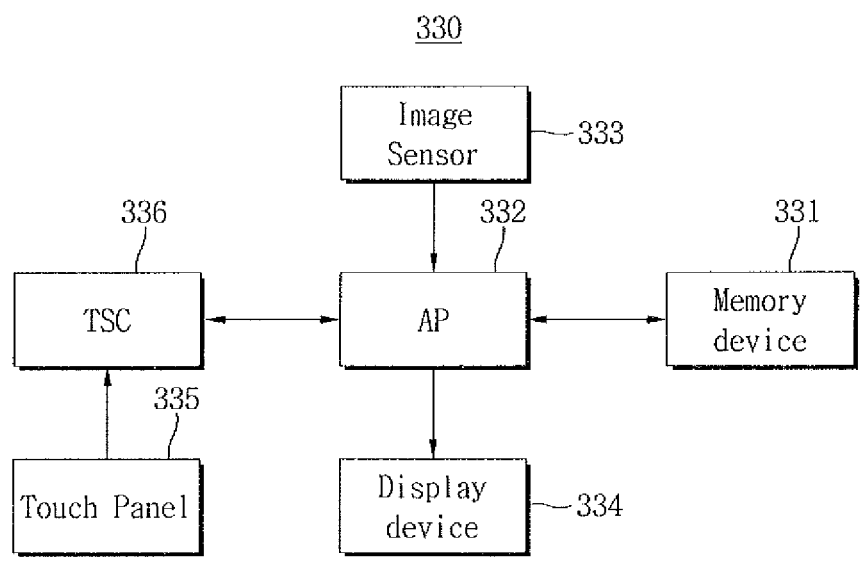
FIG. 13 is a block diagram illustrating an electronic system 330 including the TSC shown in FIG. 1 in accordance with still another embodiment of the inventive concept.

FIG. 13 is a block diagram illustrating an electronic system 330 including a TSC in accordance with principles of inventive concepts, such as that shown in FIG. 11.

Referring to FIG. 13, the electronic system 330 may be an image processing device, for example, a digital camera, or a mobile phone on which the digital camera are installed, a smart phone, or a tablet PC, for example.

The electronic system 330 includes a memory device 331, an AP 332 including a memory controller for controlling a data processing operation of the memory device 331, for example, a write operation or a read operation, an image sensor 333, a display device 334, a touch panel 335, and a TSC 336.

The image sensor 333 converts an optical image into digital signals, and the converted digital signals are transmitted to the AP 332. According to control of the AP 332, the converted digital signals are displayed through the display device 334, or stored in the memory device 331.

Further, the data stored in the memory device 331 is displayed through the display device 334 according to the control of the AP 332.

The touch panel 335 may receive a touch signal from a user. The touch panel 335 converts the touch signal into the amount of change of capacitance in accordance with principles of inventive concepts. The touch panel 335 transmits information about the amount of change of capacitance to the TSC 336. The TSC 336 converts the information about the amount of change of capacitance into coordinate information. The TSC 336 transmits the coordinate information to the AP 332.

In exemplary embodiments, the TSC 336 may include the TSC 1 shown in FIG. 1.

Figure 14:
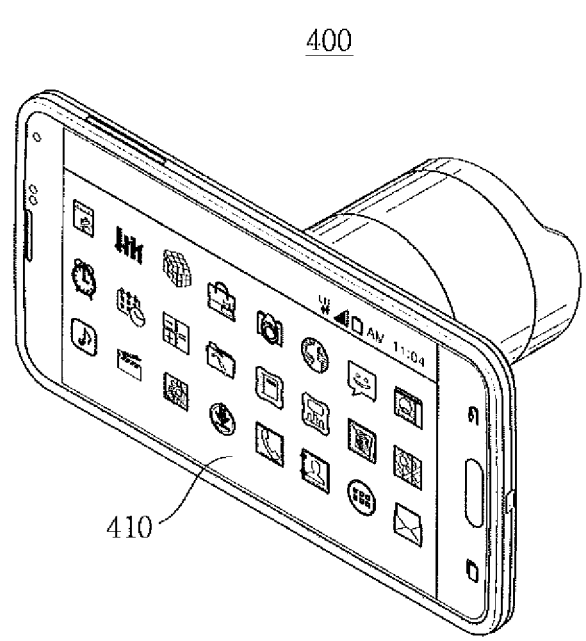
FIG. 14 illustrates a digital camera device 400 including the TSC shown in FIG. 1.

FIG. 14 illustrates a digital camera device 400 including the TSC shown in FIG. 1.

Referring to FIG. 14, the digital camera device 400 operates with an Android™ OS. In exemplary embodiments, the digital camera device 300 may include a Galaxy Camera™ or Galaxy Camera2™, for example.

The digital camera device 400 may include a touch panel 410 to receive a touch input from a user, a TSC configured to control the touch panel 410, an image sensor configured to capture an image or a moving picture and an AP configured to control the image sensor.

In exemplary embodiments, the digital camera device 400 may include the TSC 1 shown in FIG. 1.

Figure 15A:
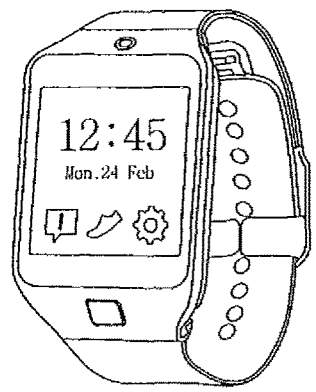
FIGS. 15A to 15C illustrate wearable devices including the TSC shown in FIG. 1.
Figure 15B:
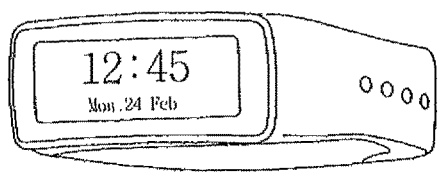
Figure 15C:
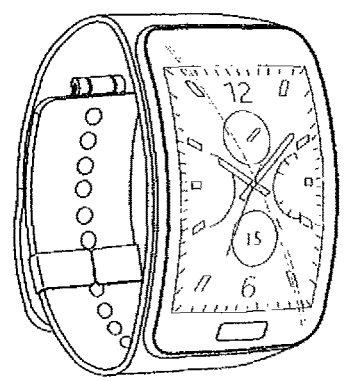

FIGS. 15A to 15C illustrate wearable devices including the TSC shown in FIG. 1.

Referring to FIGS. 15A and 15C, each of first to third wearable devices 510 to 530 has a type of a wrist watch. Each of the first to third wearable devices 510 to 530 may operate with an Android™ OS or TIZEN™ OS, for example In exemplary embodiments, the first wearable device 510 may include a Galaxy Gear2™. The second wearable device 520 may include a Galaxy Gear Fit™. The third wearable device 530 may include a Galaxy Gear S™.

Each of the first to third wearable devices 510 to 530 may include an AP which operates with an Android™ operating system (OS) or TIZEN™ OS, an image sensor which captures an image or a moving picture and a display device which displays the photographed image or a moving picture.

In exemplary embodiments, each of the first to third wearable devices 510 to 530 may include a TSC in accordance with principles of inventive concepts, such as TSC 1 shown in FIG. 1.

Figure 16:
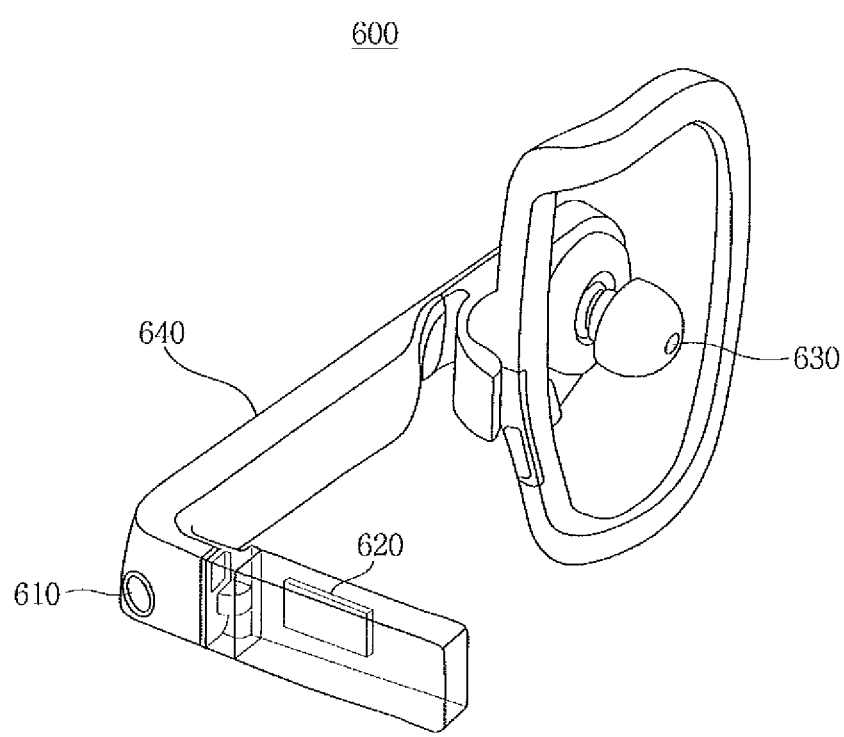
FIG. 16 illustrates a wearable device including the TSC shown in FIG. 1.

FIG. 16 illustrates a wearable device including a TSC in accordance with principles of inventive concepts such as the TSC shown in FIG. 1.

Referring to FIG. 16, the fourth wearable device 600 may be worn on an ear and provide sound and image information to a user. The fourth wearable device 600 operates with an Android™ OS or TIZEN™ OS. In exemplary embodiments, the fourth wearable devices 500 may include a Galaxy Gear Blink™.

The fourth wearable device 600 may include an image sensor 610 which captures an image and a moving picture, a display device 620 which displays the photographed image, an earphone 630, a touch panel 640 for receiving a touch input, and a touch sensor controller which is not shown for converting the touch input into a touch coordinate.

In the embodiment, the fourth wearable device 600 may include a TSC in accordance with principles of inventive concepts such as the TSC 1 shown in FIG. 1.

The exemplary embodiment of touch AFE in accordance with principles of inventive concepts may remove noise caused by a display device and improve a hover proximity signal by removing low-frequency noise. A touch AFE in accordance with principles of inventive concepts may increase a touch sensitivity of a sensor for sensing a hover event. Inventive concepts may be applied to a touch sensor controller and a mobile device having the same, for example.

Although a few embodiments have been described, those skilled in the art will readily appreciate that many modifications are possible without materially departing from the novel teachings and advantages. Accordingly, all such modifications are intended to be included within the scope of inventive concepts as defined in the claims.

What is claimed is:

1. A touch analog front-end (AFE) comprising:
a transmitter configured to charge a touch panel; and
a receiver configured to sense the touch panel,
wherein the receiver comprises:
a charge-to-voltage (C2V) converter configured to convert a change in an amount of capacitance related to the touch panel into a voltage signal;
a correlated double sampling (CDS) block configured to divide the voltage signal into a positive signal and a negative signal and to sample each of the positive signal and the negative signal; and
an integrator configured to accumulate a difference between the sampled positive signal and the sampled negative signal.

2. The touch AFE of claim 1, wherein the touch panel includes M X-axis line sensors and N Y-axis line sensors, wherein M and N are integers greater than or equal to one,
the transmitter includes M+N transmitters configured to charge each of the M X-axis line sensors and the N Y-axis line sensors, and
the receiver includes first and second receivers configured to sense each of a pair of the M X-axis line sensors or a pair of the N Y-axis line sensors.

3. The touch AFE of claim 2, wherein a display driver integrated circuit (DDI) transmits a horizontal synch signal to a display panel and each of the M+N transmitters charges each of the M X-axis line sensors and the N Y-axis line sensors in synchronization with the horizontal synch signal at the same time.

4. The touch AFE of claim 3, wherein after each of the M+N transmitters charges each of the M X-axis line sensors and the N Y-axis line sensors at the same time, and each of the first and second receivers senses a pair of each of the M X-axis line sensors and the N Y-axis line sensors at the same time.

5. The touch AFE of claim 1, wherein the CDS block includes a first sample-and-hold (SHA) filter configured to sample the positive signal and a second SHA filter configured to sample the negative signal.

6. The touch AFE of claim 1, wherein the CDS block samples the positive and negative signals and removes noise at a frequency higher than a predetermined frequency.

7. The touch AFE of claim 1, wherein the integrator removes noise at a frequency lower than a predetermined frequency using a voltage difference between the sampled positive signal and the sampled negative signal.

8. The touch AFE of claim 1, wherein the integrator generates a capacitive profile using the accumulated difference between the sampled positive signal and the sampled negative signal.

9. A touch sensor controller (TSC) comprising a touch analog front-end (AFE) including M+N transmitters configured to charge each of M X-axis line sensors and N Y-axis line sensors, and first and second receivers configured to sense a pair of the M X-axis line sensors or a pair of the N Y-axis line sensors, wherein M and N are integers greater than or equal to one,
wherein each of the first and second receivers comprises:
a C2V converter configured to convert an amount of change of a capacitance received from a touch panel into a voltage signal;
a CDS block configured to divide the voltage signal into a positive signal and a negative signal and to sample each of the positive signal and the negative signal; and
an integrator configured to accumulate a difference between the sampled positive signal and the sampled negative signal.

10. The TSC of claim 9, wherein a DDI transmits a horizontal synch signal to a display panel and each of the M+N transmitters charges each of the M X-axis line sensors and the N Y-axis line sensors in synchronization with the horizontal synch signal at the same time.

11. The TSC of claim 10, wherein after each of the M+N transmitters charges each of the M X-axis line sensors and the N Y-axis line sensors at the same time, and each of the first and second receivers senses a pair of each of the M X-axis line sensors and the N Y-axis line sensors at the same time.

12. The TSC of claim 9, wherein the CDS block includes a first sample-and-hold (SHA) filter configured to sample the positive signal and a second SHA filter configured to sample the negative signal.

13. The TSC of claim 9, wherein the CDS block samples the positive signal and the negative signal and removes noise at a frequency higher than a predetermined frequency.

14. The TSC of claim 9, wherein the integrator removes noise at a frequency lower than a predetermined frequency using a voltage difference between the sampled positive signal and the sampled negative signal.

15. The TSC of claim 9, wherein the integrator generates a capacitive profile using the accumulated difference between the sampled positive signal and the sampled negative signal.

16. An electronic circuit for sensing input to a capacitive touch screen, comprising:
a charge to voltage converter to convert charge related to a change in an amount of capacitance at an input of the charge to voltage converter to an output voltage signal corresponding to the change in capacitance;
a sample hold circuit to receive the output voltage signal output from the charge to voltage converter and to convert the voltage signal to a differential voltage signal representative of the change in capacitance; and
an integrator circuit to receive the differential voltage signal from the sample hold circuit and to integrate the differential signal to produce an analog output signal representative of the change in capacitance,
wherein the sample hold circuit is a correlated double sampling circuit, and
wherein the correlated double sampling circuit is configured to filter noise at a frequency higher than a predetermined frequency from the voltage signal.

17. The electronic circuit of claim 16, further comprising an offset removal circuit connected to remove an offset at the input to the charge to voltage converter.

18. The electronic circuit of claim 16, wherein the integrator circuit is configured to filter noise at a frequency lower than a predetermined frequency from the differential signal provided by the correlated double sampling circuit.

* * * * *